A. KADOW.
BLOWPIPE OPERATING MECHANISM FOR GLASS FORMING APPARATUS.
APPLICATION FILED JUNE 4, 1917.
1,331,772.
Patented Feb. 24, 1920.
6 SHEETS—SHEET 1.
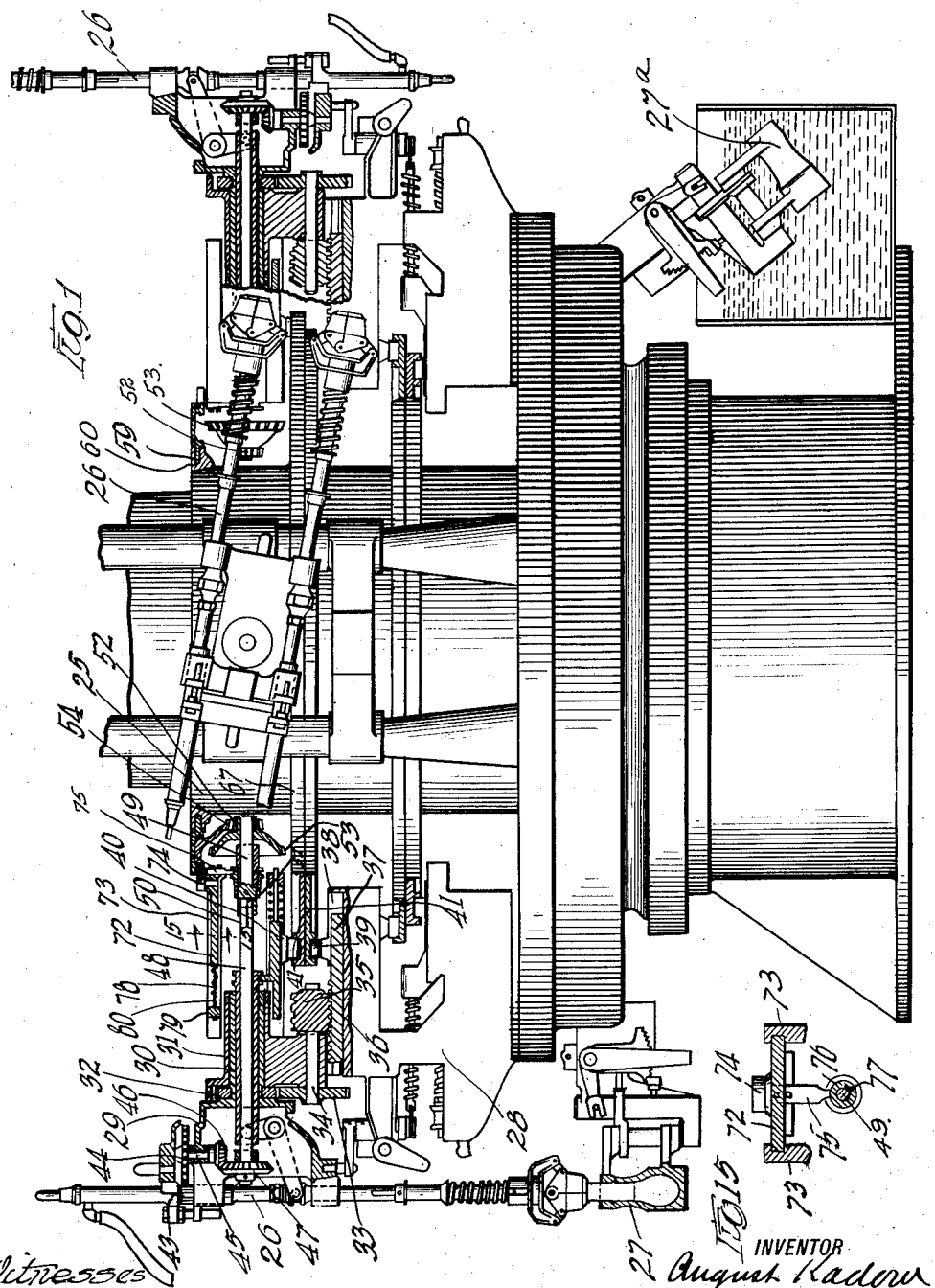

A. KADOW.
BLOWPIPE OPERATING MECHANISM FOR GLASS FORMING APPARATUS.
APPLICATION FILED JUNE 4, 1917.
1,331,772.
Patented Feb. 24, 1920.
6 SHEETS—SHEET 2.
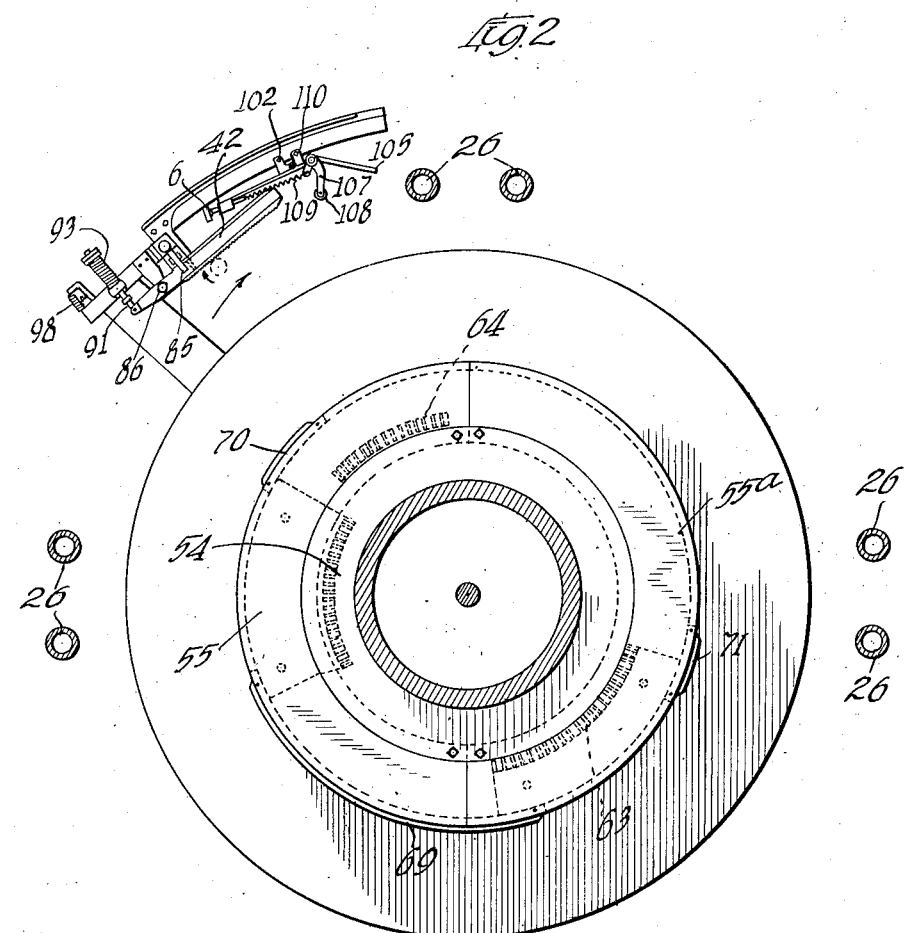
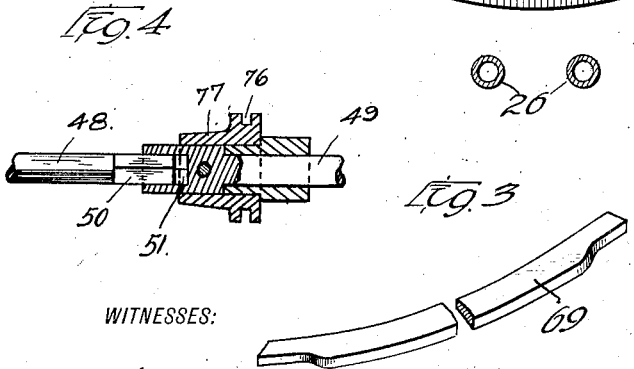
WITNESSES:
INVENTOR
BY
ATTORNEYS

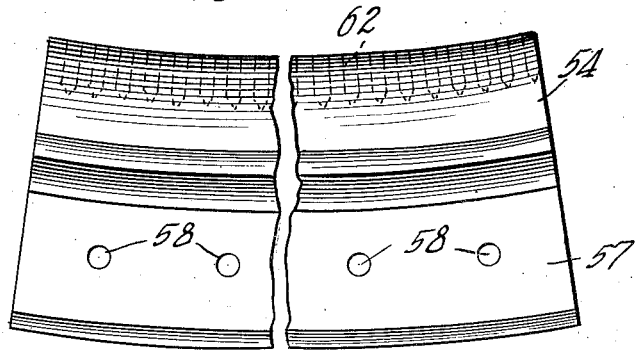
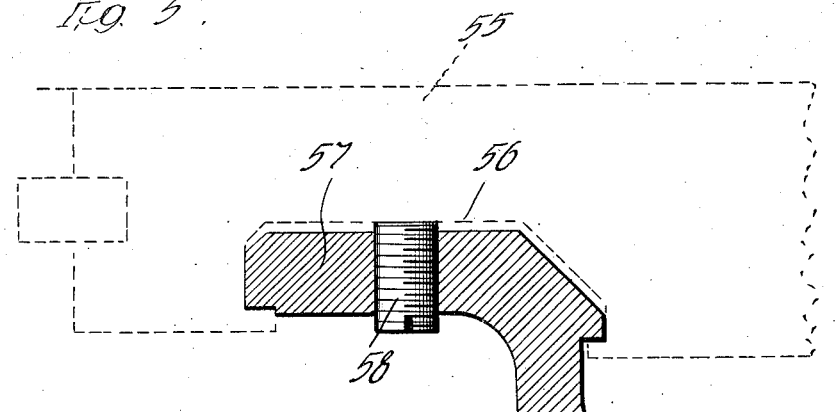

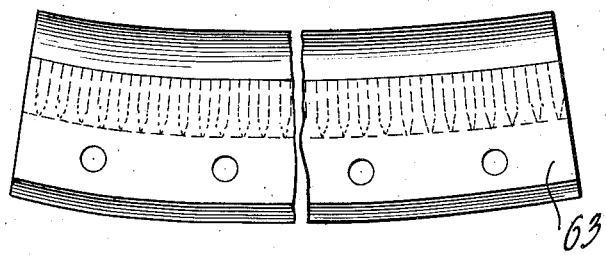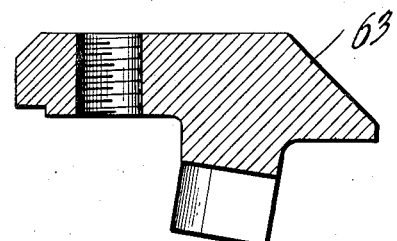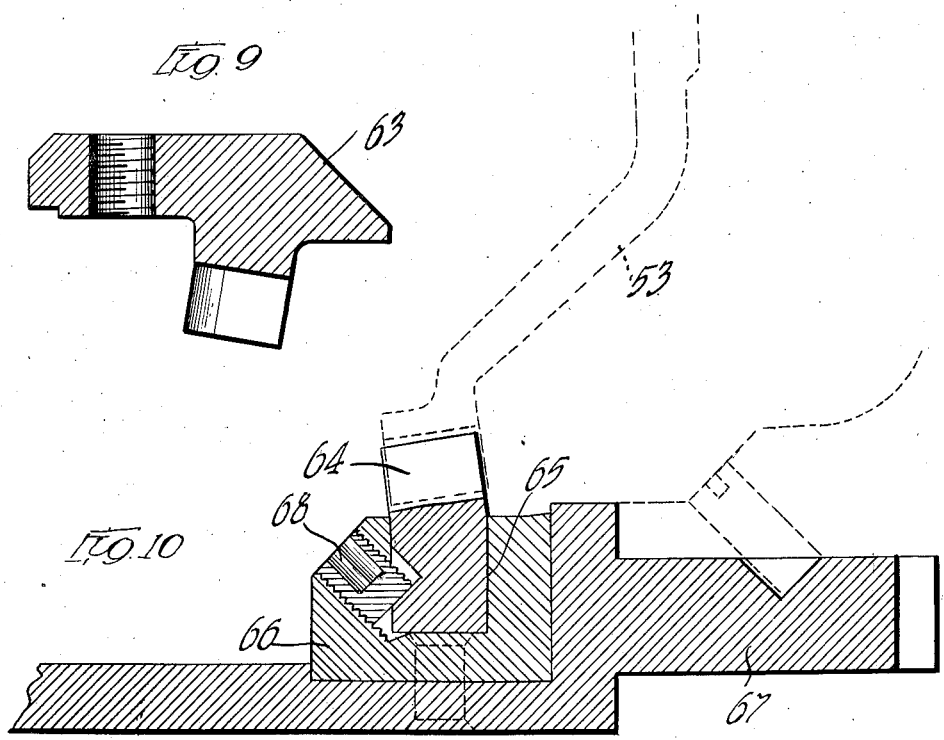

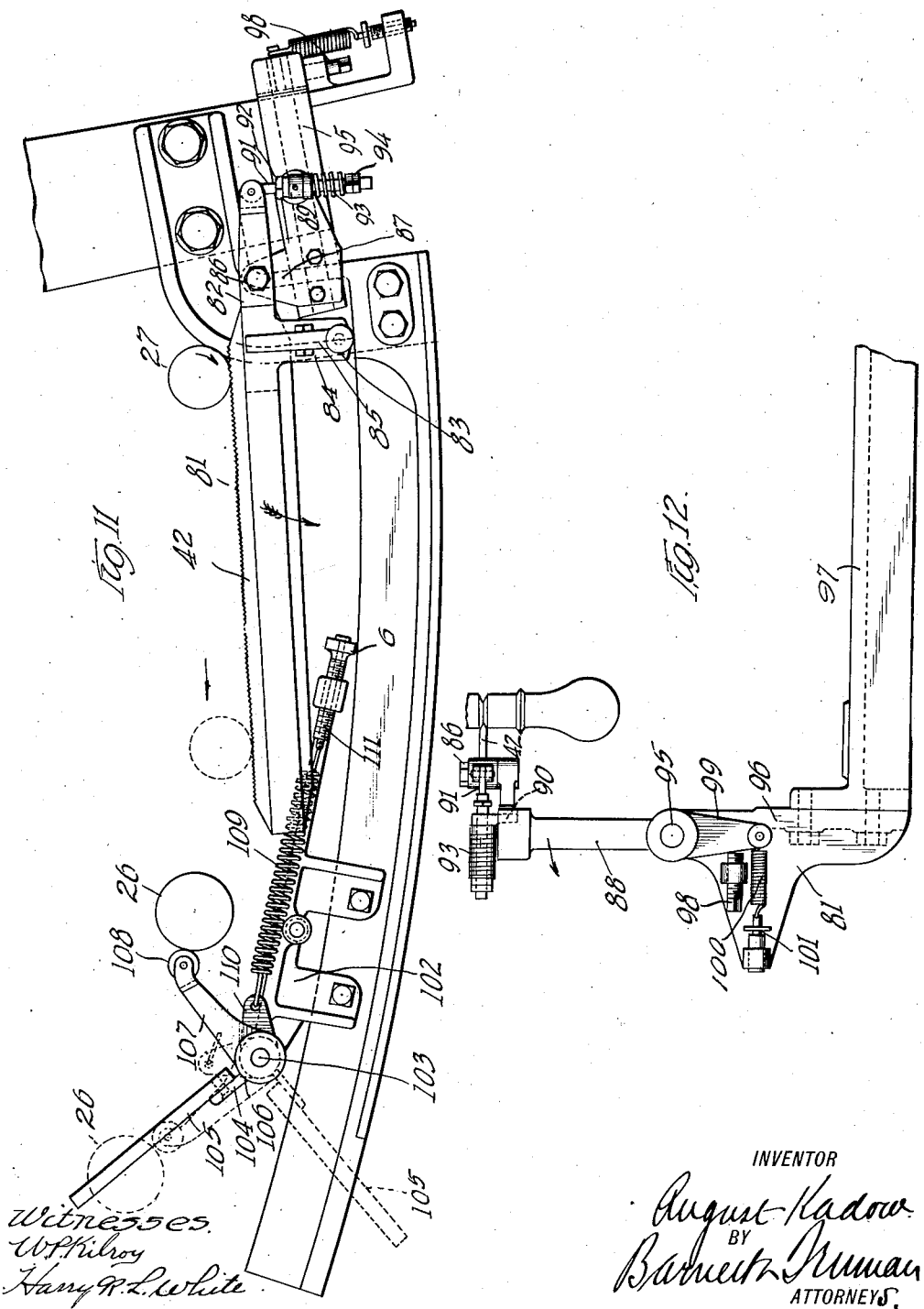

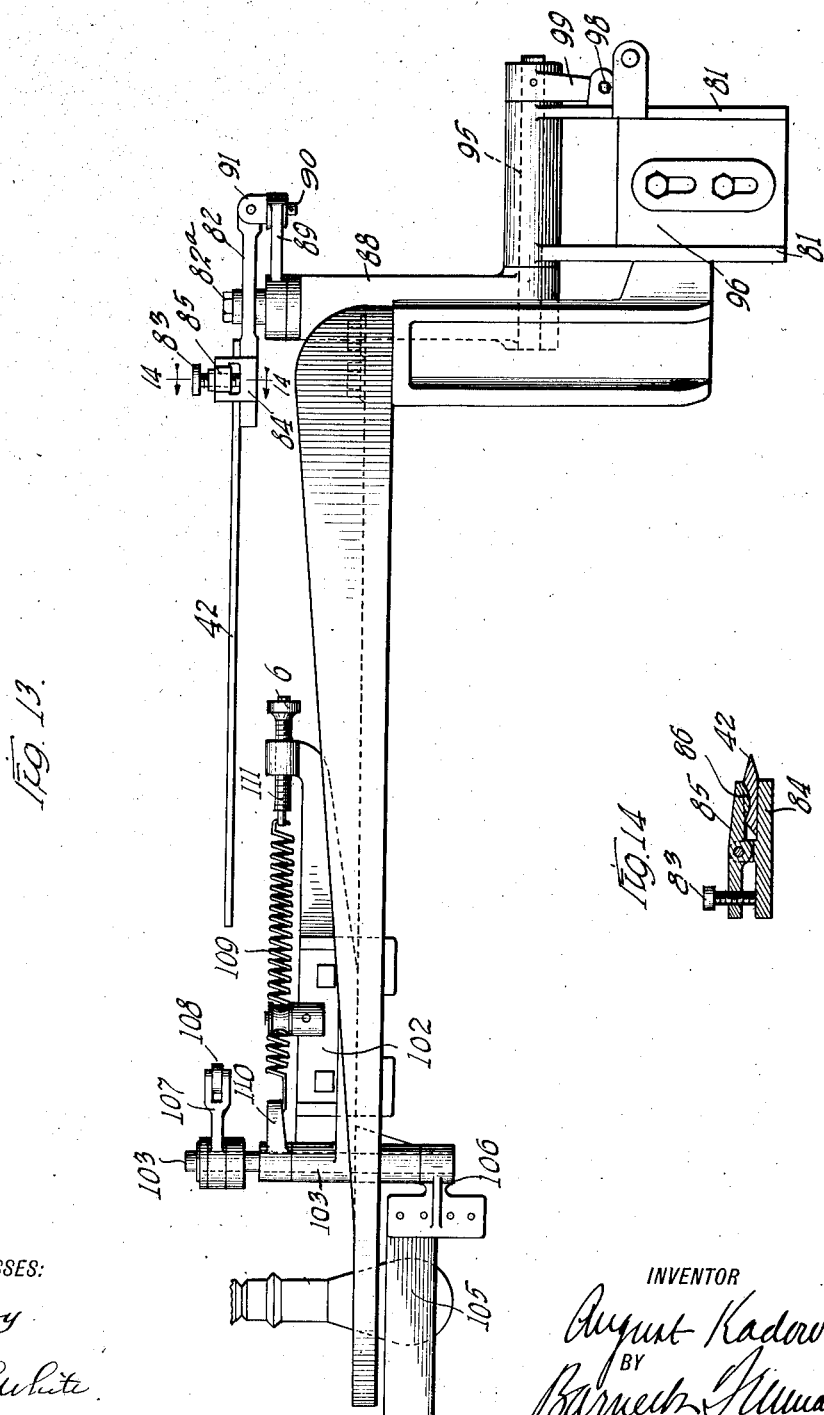

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

BLOWPIPE-OPERATING MECHANISM FOR GLASS-FORMING APPARATUS.

1,331,772.  Specification of Letters Patent.  Patented Feb. 24, 1920.

Application filed June 4, 1917. Serial No. 172,704.

*To all whom it may concern:*

Be it known that I, AUGUST KADOW, a citizen of the United States, residing at Toledo, in the county of Lucas and State of Ohio, have invented certain new and useful Improvements in Blowpipe-Operating Mechanism for Glass-Forming Apparatus, of which the following is a specification.

My invention relates to apparatus for manufacturing glass articles of the type employing a blow-pipe or spindle which receives a gather of glass and develops the same by the introduction into the blank of air and through certain movements of the spindle. A machine of this general type is shown in my co-pending application Serial No. 570,621, filed July 6, 1910, and in my Patent No. 1,248,664, of Dec. 4, 1917. In this machine there is a rotary supporting structure carrying, in circumferential arrangement thereon, a number of sets of glass forming mechanisms, each set comprising a blow-pipe or spindle, a gathering device which operates to withdraw glass from the glass furnace and deliver the gather to the spindle, and a finishing mold in which the blank is treated at the last stage of its development. After the spindle has received the blank it is revolved on its longitudinal axis and at the same time air is blown into the blank. This operation is preferably begun while the spindle is in vertical position with the end holding the blank up, and is continued after the spindle has been turned to a position not far from the horizontal, one way or the other. After the blank has been developed in this manner the revolution of the spindle on its longitudinal axis ceases and the spindle is turned to a position with the blank downward and is oscillated back and forth on a transverse axis. The next step is to inclose the blank in the finishing mold and to rotate the same therein by a renewed revolution of the spindle on its longitudinal axis.

One of the primary objects of my present invention is to provide, in a machine of this general type, mechanism for revolving the spindle by means of which the spindle is revolved at a higher rate of speed while the blank is in the mold than during the initial development of the blank. Experience has shown it to be desirable to treat the blank in this way. It is not necessary nor advantageous to revolve the blank at a high rate of speed in the first stages of its development. But in completing its development in the finishing mold I have found that if the blank is revolved quite rapidly a higher pressure of air can be used than is otherwise possible with the result that the walls of the blank are more quickly brought into contact with the mold and as a consequence the article is produced more expeditiously and its quality is likely to be better. For example, where, as in the manufacture of electric light bulbs, it is essential that the wall of the vessel be of uniform thickness throughout, this result can be better accomplished by a machine constructed in accordance with my present invention than by an apparatus having the spindle revolving mechanism of the pending application above referred to.

A further object of the invention is to provide an improved mechanism for scoring the finished blank and removing the same from the spindle.

The invention consists in the novel constructions, arrangements and devices to be hereinafter described and claimed for carrying out the above stated objects and such other incidental objects as will appear from the following description. It will be understood that while the mechanisms of my present invention are intended particularly for a machine constructed, except as to these improvements as shown in my former application above referred to, these improved mechanisms will be found susceptible of use in connection with other glass forming apparatus of the same general character.

The invention is illustrated, in a preferred embodiment, in the accompanying drawings, wherein—

Figure 1 is a fragmentary side elevation of a glass forming machine, certain parts being shown in section.

Fig. 2 is a sectional plan view, somewhat diagrammatic in its character, intended particularly to show the relation of the racks and cams for operating the spindle revolving mechanism.

Fig. 3 is a view, in perspective, of one of the cams shown in Fig. 2.

Fig. 4 is a longitudinal sectional view showing, on a larger scale than Fig. 1, a portion of the two-part shaft which constitutes part of the spindle revolving mechanism.

Fig. 5 is a sectional elevation of the high speed rack and associated parts.

Fig. 6 is a fragmentary plan view of the rack shown as removed from the part of the machine to which it is attached when in use.

Fig. 7 is a detail view illustrating the preferred contour of the teeth of the racks and of the gears which mesh with the racks.

Fig. 8 is a plan view, and Fig. 9 a cross sectional view, of the low speed rack.

Fig. 10 is a sectional view of a rack, and associated parts, for giving a reverse movement of revolution to the spindle.

Fig. 11 is a plan view of the mechanism for scoring the finished blank and removing the same from the spindle; this view being taken from a point on the opposite side of the machine from the view point of Fig. 2.

Fig. 12 is an end elevation of the scoring mechanism viewed from a point at the left hand end of Fig. 13.

Fig. 13 is a side elevation of the scoring mechanism.

Fig. 14 is a detail sectional view on line 14—14 of Fig. 13, and

Fig. 15 is a detail sectional view on line 15—15 of Fig. 1.

Like characters of reference designate like parts in the several figures of the drawings.

Referring to the drawings, 25 is a stationary structure carrying certain cams, to be hereinafter described, for effecting the several movements of the blow-pipe 26. The blow-pipe and the finishing mold 27, together with the glass gathering device (not shown) are carried by a rotating structure 28 which surrounds the stationary structure 25. 29 is a blow-pipe support provided with a hub 30 which is mounted revolubly in a bearing 31 on the rotary structure 28. The hub 30 is provided with a gear wheel 32 in mesh with a gear wheel 33 on a stub shaft 34, on the other end of which is a spiral gear 35 in mesh with a spiral rack 36 formed on a slide 37 adapted to move back and forth in a slideway 38 radially disposed on the rotary structure 28. The slide 37 is provided with an anti-friction roller 39 adapted to enter a cam groove 40 formed in a cam ring 41 fixed to the stationary structure 25. The cam groove 40 is sinuous whereby, at the proper points in the rotary movement of any given blow-pipe around the stationary structure 25, the slide 37 is given radial movements in and out, thereby causing the blow-pipe to turn on its horizontal or transverse axis, namely, on the axis of hub 30. The mechanism just described is substantially the same as that shown in my co-pending application above referred to. By means of said mechanism the blow-pipe, after receiving the blank, will, first, be moved to the position indicated at the right of Fig. 1, in which position the blank is developed by the introduction of air and by the revolution of the blow-pipe on its longitudinal axis; second, will be turned to its inverted position with the blank downward, and oscillated in the manner above described, and, finally, will be returned to a position with the blank holding means uppermost for the purpose of receiving a new gather. After the blank has been elongated by oscillation of the blow-pipe on its transverse axis, it is brought to a vertical position with the blank hanging downwardly therefrom and the blank is inclosed by the finishing mold 27. The mechanisms for accomplishing the necessary movements of the finishing mold do not concern the present invention and, so far as they are incidentally shown in the drawings, are the same as shown and described in my co-pending application above referred to. Preferably the revolution of the blow-pipe on its longitudinal axis ceases during the swinging out or elongation of the blank. This movement of revolution is resumed as soon as the blank is inclosed by the finishing mold; and in accordance with my present invention the speed of revolution is considerably greater than during the initial development of the blank. The finishing mold is then disengaged from the blank and dropped to the position indicated at 27$^a$ and the blank, now ready to be discharged, is moved along the edge of a scoring knife 42, the direction of rotation of the machine being shown by the arrow in Fig. 2. During this period the blank is revolved in the direction against the edge of the knife, so to speak. Revolution in the opposite direction, whereby the blank rolls along the knife, would be less effective. To accomplish this movement of the blank it is necessary to revolve the blow-pipe in the direction opposite to that in which it is revolved at low speed, during the initial development of the blank, and at high speed in the finishing mold. The mechanism for giving the blow-pipe its movement of rotation at two speeds in one direction and at one speed in the reverse direction, is constructed as follows:

43 is a gear wheel keyed to the blow-pipe 26. This gear is meshed by a gear 44 on a shaft 45 turning in a bearing on the holder 29. The other end of shaft 45 is provided with a bevel gear 46 in mesh with a bevel gear 47 on one section of a two-part driving shaft 48, 49. The end of shaft section 48 is square, as indicated at 50, and fits slidingly into a square socket 51 in the shaft section 49. The latter carries a small, or high speed, gear 52 and a large, or low speed, gear 53. The high speed gear is adapted to mesh with a rack 54 on a sectional cam plate 55, 55ª. The cam plate section 55 is formed with an undercut groove 56 (Fig. 5) to receive the attaching plate 57 of the rack which is put in place before the cam ring sections are assembled. The rack is held at any desired position in the groove by means of a set screw 58. The cam ring sections 55, 55ª are provided with tongues 59 to fit into a groove formed in the circumferential webs 60 on the stationary portion 25 of the machine. The teeth of the gear and rack (and the same is true of the low speed gear and rack and the reversing rack) are beveled as indicated at 61 (Fig. 7), and are pointed or beveled, as indicated at 62, at the ends of the teeth which come into engagement with the gear when the latter is meshed with the rack. The low speed rack 63 (Figs. 8 and 9) is attached to the cam ring 55ª in a similar manner (Fig. 2). The reversing rack 64 is arranged in a groove 65 formed in a ring 66 secured to the cam ring 67 which forms part of the stationary structure 25 of the machine. The rack is held in place by one or more screws 68. The reversing rack is preferably arranged so as to be meshed by the low speed gear 53. 69 is a cam on the cam ring 55, 55ª arranged so as to effect the disengagement of the low speed gear 53 from the low speed rack 63, and thereafter bring about the engagement of the high speed gear 52 with the high speed rack 54. 70 is a cam for disengaging the high speed gear and rack and bringing into engagement the low speed gear with the reverse rack. 71 is a cam for causing the low speed gear to mesh with the low speed rack. For effecting these movements a slide 72 is provided having a radial movement in guides 73 forming part of the rotary structure 28 of the machine. The slide 72 is provided with a roller 74 adapted to bear against cams 69, 70, 71. Projecting from the under side of the slide 72 is a finger 75, the end of which extends into a groove 76 on a collar 77 rigidly attached to the driving shaft section 49. The slide 70 is provided with a rod 78 which extends slidably through cross piece 79 connecting the guides 73, and 80 is a spring surrounding the rod and interposed between the end of the slide and cross piece 79.

The scoring knife 42 is preferably formed with serrations along its edge 81 and is secured to a pivoted L-shaped lever 82 by means of a clamping member 85. The clamping member 85 is pivoted between upstanding lugs 84 on the lever 82 and is held in clamping contact with the knife 42 by means of the set screw 83. The upper surface of the knife may be formed, if desired, with a depression such as shown at 86 (Fig. 14) so as to provide a suitable clamping surface. The lever 82 is pivoted at 82ª to one arm 87 of an angular bracket carried at the upper end of a bell crank arm 88. The other arm 89 of said angular bracket supports a pivot stud 90. A rod 91 is connected to the bifurcated end of the pivoted lever 82 and extends through an aperture in said pivot stud so as to be slidable therein. 92 designates a stop nut on the rod 91, and 93 a coil spring interposed between the stud 90 and the nut 94 at the outer end of the rod 91. With this construction the knife 42 may be clamped in any desired angular position with respect to the lever 82, and further angular adjustment may be secured by proper manipulation of the stop nuts 92, 94 on the rod 91 so as to change the angular position of the lever 82. When the neck of the blown article comes in contact with the knife 42 the coil spring 93 will permit the knife to rock on the pivot 86 so as to move in the direction of the feathered arrow in Fig. 11. A further resilient rocking movement of the knife is secured by means of the pivoted bell crank arm 88 which is secured to one end of a rock shaft 95. The rock shaft is mounted in a suitable bearing in a supporting casting 96 bolted or otherwise secured to the stationary support 97. The angular position of the arm 88 may be varied by means of the set screw 98 which bears against one edge of the short arm 99 of the bell crank. The arm 88 is held in its adjusted position by means of the coil spring 100 which is attached to the lower end of crank 99 and to one end of a screw bolt 101.

The blank 27, after moving out of contact with the knife 42, is removed from the blow pipe 26 by means of the following mechanism: 102 designates a supporting casting provided with a suitable bearing for a vertical shaft 103. The shaft carries at its lower end a knocking off paddle 104 consisting, preferably, of a piece of wood 105 secured to a metal hub 106. An arm 107 is secured to the upper end of said shaft and is provided with a roller 108 adapted to engage the lower portion of the blow pipe 26. As the blow-pipe 26 moves from the full line position shown in Fig. 11 to the dotted line position, the paddle 105 is moved to the dotted line position against the tension of the spring 109. The spring is attached to a short arm 110 on the vertical shaft 106 and to an adjusting screw 111. As the roller 108 rides off the blow-pipe 26 the paddle 105 is moved, by the action of the spring 109, from the dotted line position to the full line position and thereby strikes the glass article in a manner to remove it from the blow pipe. The tension of the spring 109 may be regulated by the manipulation of the adjusting screw 111 so as to govern the force of the blow delivered by the paddle 105. This blow will be sufficient to remove the glass article from the blow-pipe without danger of breaking or otherwise damaging the article.

Operation: The blow-pipe, it will be understood, receives the gather while in the position indicated at the right hand side of Fig. 1 (Figs. 1 and 2). Soon after this the low speed gear 53 is brought into mesh with the rack 63 and the blow-pipe is thereupon rotated on its longitudinal axis. At the same time, air is admitted to the blank by mechanism which need not be described. Immediately after the blow-pipe begins its low speed revolution (or it may be before), it is turned on its transverse axis, by means of cam 40 and the mechanism actuated thereby, to the position shown in the center of Fig. 1, or it may be to a position in which the blank holding end of the blow-pipe is above the axis of rotation instead of being below, as shown. The revolution of the blow-pipe on its longitudinal axis continues, with the blow-pipe in this position, until roller 74 rides over cam 69 which disengages the low speed gear and rack. As the roller rides along cam 69 the blank is swung out by oscillating movements of the blow-pipe on its transverse axis, these movements being brought about by the configuration of cam 40 as above described in my former application above referred to. When the roller 74 rides down from cam 69 the high speed gear 52 is brought into mesh with the high speed rack 54. By this time the blank has been inclosed by the mold 27, as shown at the left hand side of Fig. 1, by means of mechanism forming no part of my present invention, and the blow-pipe is now revolved on its longitudinal axis at a relatively high rate of speed. This is desirable in order that the glass of the blank may be quickly brought into contact with the wall of the mold. When the blank is rotated rapidly this can be effected by using a stronger pressure of air than could be used if the blank were rotated at a low speed as heretofore.

After the blank is completed in the finishing mold the mold opens and drops to the position shown at the right hand side of Fig. 1. The blow-pipe, with the blank thereon, moves around until the neck of the blank is brought against the scoring knife 42. Before this occurs, roller 74 meets cam 70 and the high speed gear 52 is disengaged from rack 54. As the roller rides down from cam 70 the low speed gear 53 is brought into mesh with the reversing rack 64. This causes the neck of the blank to revolve in the direction indicated by the small unfeathered arrow in Figs. 2 and 11. The movement of the blank along the knife while being so revolved causes the knife to cut or score the blank. After the blank is moved out of contact with the knife the arm 107 is engaged by the spindle 26 and paddle 105 is moved to the dotted line position (Fig. 11). When the arm 107 is released the spring 109 causes the paddle 105 to fly back to the full line position shown in Fig. 11, and thereby strikes the blank with sufficient force to remove it from the blow-pipe.

In the drawings I have shown two blow-pipes or spindles on the same gear. These operate simultaneously so that the glass articles are formed in pairs. I have only described one of these blow-pipes, and the mechanism for revolving it. In a double machine of this type the other spindle will be provided with similar mechanism.

I claim:

1. In apparatus for making glass articles, the combination of a blow-pipe revoluble on its longitudinal axis, and mechanism for revolving it at different speeds during different periods of the development of the blank.

2. In apparatus for making glass articles, the combination of fixed and movable supporting structures, a blow-pipe carried by the movable structure which is revoluble on its longitudinal axis, and mechanism actuated through the movement of said movable structure with respect to the fixed structure for revolving the blow-pipe at different speeds during different portions of the period of development of the blank.

3. In apparatus for making glass articles, the combination of a rotatable support, a blow-pipe carried thereby which is revoluble on its longitudinal axis, and mechanism actuated through the rotation of said support for revolving the blow-pipe at different speeds during different portions of the period of development of the blank.

4. In apparatus for making glass articles, the combination of a rotatable support, a blow-pipe carried thereby which is revoluble on its longitudinal axis, and mechanism actuated through the rotation of said support for revolving the blow-pipe at different speeds during different portions of the period of development of the blank, comprising high and low speed gears on the support and stationary racks with which said gears are adapted to mesh.

5. In apparatus for making glass articles, the combination of a rotatable support, a blow-pipe carried thereby which is revoluble on its longitudinal axis, and mechanism actuated through the rotation of said support for revolving the blow-pipe at different speeds during different portions of the period of development, comprising high and low speed gears on said support, stationary racks, and means for bringing said gears and racks into and out of mesh.

6. In apparatus for making glass articles, the combination of a rotatable support, a blow-pipe carried thereby which is revoluble on its longitudinal axis, and mechanism actuated through the rotation of said support for revolving the blow pipe at different speeds during different portions of the period of development of the blank, comprising high and low speed gears on said support, stationary racks, and mechanism actuated through the rotation of said support for bringing said gears into and out of mesh with said racks.

7. In apparatus for making glass articles, the combination of a rotatable support, a blow-pipe carried thereby which is revoluble on its longitudinal axis, and mechanism actuated through the rotation of said support for revolving the blow-pipe at different speeds during different portions of the period of development of the blank, comprising high and low speed gears on said support, stationary racks, and a cam and slide which coöperate through the rotation of said support for bringing said gears into and out of mesh with said racks.

8. In apparatus for making glass articles, the combination of a rotatable support, a blow-pipe carried thereby which is revoluble on its longitudinal axis, a driving shaft, a gear train operatively connecting said driving shaft with the blow-pipe, high and low speed gears on said driving shaft, and stationary racks with which said gears are adapted to mesh at different places during the rotary movement of said blow-pipe.

9. In apparatus for making glass articles, the combination of a rotatable support, a blow-pipe carried thereby which is revoluble on its longitudinal axis, a driving shaft, a gear train operatively connecting said driving shaft with the blow-pipe, high and low speed gears on said driving shaft, and stationary racks with which said gears are adapted to mesh at different places during the rotary movement of said blow-pipe, two of said racks being arranged so that they operate to revolve the blow-pipe in respectively opposite directions.

10. In apparatus for making glass articles, the combination of a rotatable support, a blow-pipe carried thereby which is revoluble on its longitudinal axis, a driving shaft, a gear train operatively connecting said driving shaft with the blow pipe, high and low speed gears on said driving shaft, stationary racks with which said gears are adapted to mesh at different places during the rotary movement of said blow-pipe, and cams arranged to bring said gears into and out of mesh with said racks.

11. In apparatus for making glass articles, the combination of a blow-pipe revoluble on its longitudinal axis, and mechanism for revolving it at different speeds and in opposite directions during different portions of the period of development of the blank.

12. In apparatus for making glass articles, the combination of a rotatable support, a blow-pipe carried thereby which is revoluble on its longitudinal axis, and mechanism actuated through the rotation of the support for revolving the blow pipe at different speeds and in opposite directions during different portions of the period of development of the blank.

13. In apparatus for making glass articles, the combination of a rotatable support, a blow-pipe carried thereby which is revoluble on its longitudinal axis, high and low speed gears on said support operatively connected with the blow-pipe to effect the revolution thereof, and stationary high speed, low speed and reversing racks with which said gears are adapted to be meshed during different portions of the period of development of the blank.

14. In apparatus for making glass articles, the combination of a rotatable support, a blow-pipe carried thereby which is revoluble on its longitudinal axis, high and low speed gears on said support operatively connected with the blow-pipe to effect the revolution thereof, stationary high speed, low speed and reversing racks with which said gears are adapted to be meshed during different portions of the period of development of the blank, and a cam-operated mechanism actuated through the rotation of said support for shifting said gears into and out of operation with said racks.

15. In apparatus for making glass articles, the combination of a rotatable support, a blow-pipe carried thereby which is revoluble on its longitudinal axis, high and low speed gears on said support operatively connected with the blow-pipe to effect the revolution thereof, and a stationary high speed rack adapted to be meshed by said high speed gear, and stationary low speed and reversing racks adapted to be meshed by said low speed gear.

16. In apparatus for making glass articles, the combination of a rotatable support, a blow-pipe carried thereby which is revoluble on its longitudinal axis, high and low speed gears on said support operatively connected with the blow-pipe to effect the revolution thereof, and a high speed rack adapted to be meshed by said high speed gear, and low speed and reversing racks adapted to be meshed by said low speed gear.

17. In apparatus for making glass articles, the combination of a rotatable support, a blow-pipe carried thereby which is revoluble on its longitudinal axis, high and low speed gears on said support operatively connected with the blow-pipe to effect the revolution thereof, and high speed, low speed and reversing racks with which said gears are adapted to be meshed during different portions of the period of development of the blank.

18. In apparatus for making glass articles, the combination of a blow-pipe revoluble upon its longitudinal axis, a driving shaft, a gear train operatively connecting the driving shaft with the blow-pipe for the purpose of revolving the same, high and low speed gears on said driving shaft, racks adapted to mesh with said gears respectively, and means for bringing said racks and gears into and out of operative engagement with each other.

19. In apparatus for making glass articles, the combination of a blow-pipe revoluble upon its longitudinal axis, a two-part telescopic driving shaft, a gear train operatively connecting the driving shaft with the blow-pipe for connecting one section of the driving shaft with the blow-pipe, high and low speed gears on the other section of said driving shaft, racks adapted to mesh with said gears respectively, and means for shifting said last-named section of the drive shaft longitudinally so as to bring said gears into and out of mesh with their racks.

20. In apparatus for making glass articles, the combination of a rotatable support, a blow-pipe carried thereby which is revoluble on its longitudinal axis, a two-part telescopic driving shaft on said support, a gear train operatively connecting one section of said shaft with said blow-pipe for revolving the same, high and low speed gears on the other section of said shaft, racks adapted to be meshed by said gears respectively, a cam, and mechanism operated thereby for shifting said last-named section of the drive shaft longitudinally so as to bring said gears into and out of mesh with their respective racks.

21. In apparatus for making glass articles, the combination of a rotatable support, a blow-pipe carried thereby which is revoluble on its longitudinal axis, a two-part telescopic driving shaft on said support, a gear train operatively connecting one section of said shaft with said blowpipe for revolving the same, high and low speed gears on the other section of said shaft, stationary racks adapted to be meshed by said gears respectively, a stationary cam, and mechanism on said support which is actuated by said cam to shift said last-named section of the driving shaft longitudinally to bring said gears into and out of mesh with their respective racks.

22. In apparatus for making glass articles, the combination of a blow-pipe, a blow-pipe carrier in which said blow-pipe is supported so as to be capable of revolution on its longitudinal axis, means for rotatably supporting said blow-pipe carrier on an axis substantially transverse to the longitudinal axis of the blow pipe, a drive shaft, the axis of which corresponds to the transverse axis, a gear train connecting said drive shaft and said blow-pipe for the purpose of revolving the blow-pipe, high and low speed gears on said drive shaft, and racks adapted to be meshed with said high and low speed gears respectively.

23. In apparatus for making glass articles, the combination of a rotatable support, a blow-pipe carrier in which said blow-pipe is supported so as to be capable of revolution on its longitudinal axis, said blow-pipe carrier being rotatably carried on said support on an axis substantially transverse to the longitudinal axis of the blow-pipe, a drive shaft, the axis of which corresponds to the transverse axis, a gear train connecting said drive shaft with said blow-pipe for the purpose of revolving the blow-pipe, high and low speed gears on said drive shaft, and racks adapted to be meshed by said high and low speed gears respectively at different points in the rotary movement of said support.

24. In apparatus for making glass articles, the combination of a rotatable support, a blow-pipe carrier in which said blowpipe is supported so as to be capable of revolution on its longitudinal axis, said blow-pipe carrier being rotatably carried on said support on an axis substantially transverse to the longitudinal axis of the blow-pipe, a drive shaft, the axis of which corresponds to the transverse axis, a gear train connecting said drive shaft with said blow-pipe for the purpose of revolving the blow-pipe, high and low speed gears on said drive shaft, racks adapted to be meshed by said high and low speed gears respectively at different points in the rotary movement of said support, and a stationary cam and mechanism operated thereby for shifting said gears to bring them into and out of mesh with said racks.

25. In apparatus for making glass articles, the combination of a rotatable support, a blow-pipe carrier having a substantially horizontally disposed hub for revolubly mounting the carrier on said support, a blow-pipe sustained by said carrier so as to be revoluble on its longitudinal axis, a two-part telescopic drive shaft extending through said hub, a gear train connecting one section of said drive shaft with said blow-pipe for revolving the same, high and low speed gears on the other section of said drive shaft, stationary racks adapted to be meshed by said gears, a stationary cam, a slide moved thereby through the rotation of said support, and with means for shifting said last-named section of the drive shaft longitudinally to bring said gears into and out of engagement with said racks.

26. In apparatus for making glass articles, the combination of a blow-pipe revoluble on its longitudinal axis, means for revolving the same at a relatively low speed during the first portion of the period of development of the glass blank, a mold in which the blank is subsequently treated, and means for revolving the blow-pipe at a higher speed during the time that the blank is in the mold.

27. In apparatus for making glass articles, the combination of a blow-pipe revoluble on its longitudinal axis, means for revolving the same at a low speed during the first portion of the period of development of the glass blank, means for oscillating the blow-pipe on the axis transverse to the longitudinal axis thereof, a mold in which the blank is subsequently treated, and means for revolving the blow-pipe on its longitudinal axis while the glass blank is in the mold and at a speed higher than the speed of revolution during the first part of the development.

28. In apparatus for making glass articles, the combination of a traveling support, means thereon for carrying a formed glass article, a scoring knife arranged adjacent to said carrying means and adapted to engage the glass article, and means for rotating the glass article while in engagement with the scoring knife so as to cause the glass article to rotate in non-rolling engagement with the scoring knife.

29. In apparatus for making glass articles, the combination of a rotatable support, a blow pipe carried by said support, a relatively stationed scoring knife arranged adjacent the blow pipe and adapted to engage the glass article upon the blow pipe, and means for rotating the glass article in non-rolling contact with the scoring knife.

30. In apparatus for making glass articles, the combination of a rotatable support, a blow pipe carried by said support, means for rotating said blow pipe at a predetermined speed for developing the glass article, a scoring knife arranged adjacent to the blow pipe, and means for rotating the blow pipe at a slower speed than before specified and in non-rolling contact with said scoring knife.

31. In apparatus for making glass articles, the combination of a moving support, means thereon adapted to carry a glass article in course of manufacture, means for scoring said glass article comprising a pivoted knife, means for resiliently holding said knife in its normal position, and means for rotating the glass article in non-rolling contact with said scoring means while said knife is moved out of its normal position by such contact with the glass article.

32. In apparatus for making glass articles, the combination of a rotatable support, blow-pipes mounted thereon adapted to carry a blank, a scoring knife, means for resiliently mounting said knife, and means operative during bodily movement of the blank along the knife for rotating the blank in such manner that its direction of peripheral travel at the point of contact with the knife is the same as that of the bodily travel of the same point past the knife.

33. In glass making apparatus, the combination of a blow-pipe, means for bodily moving the blow-pipe in a circular path, a knife resiliently mounted in the path of travel of a blank carried by the blow-pipe, and means operative during bodily travel of the blow-pipe for rotating the same and its attached blank in such manner that its direction of peripheral travel at the point of contact is the same as that of the bodily travel of the same point past the knife.

34. In glass making apparatus, the combination of a blow-pipe, means for bodily moving the same in a circular path, a scoring knife, and means for mounting said knife with capacity for bodily and pivotal movement in response to pressure applied to its cutting edge.

35. In glass making apparatus, the combination of a blow-pipe, means for bodily moving the blow-pipe and an attached blank in a circular path, a scoring knife having a pivot near one end thereof, and means for resiliently retaining said knife with a portion thereof in the path of travel of the blank.

36. In glass making apparatus, the combination of a blow-pipe, means for bodily moving the blow-pipe and an attached blank in a circular path, a scoring knife having a pivot near one end thereof, means for resiliently retaining said knife with a portion thereof in the path of travel of the blank, and means for resiliently mounting the pivot of said knife whereby to permit bodily movement of the knife.

37. In glass making apparatus, the combination of a blow-pipe, means for bodily moving the same and an attached blank in a circular path, a blank scoring knife, said knife having a straight, serrated cutting edge, means for pivoting said knife near one end thereof, and spring means for normally projecting a portion of said knife into the path of travel of the blank.

AUGUST KADOW.